(12) United States Patent
Saitoh et al.

(10) Patent No.: US 9,139,106 B2
(45) Date of Patent: Sep. 22, 2015

(54) METHOD OF CONTROLLING ELECTRIC VEHICLE

(71) Applicant: HONDA MOTOR CO., LTD., Tokyo (JP)

(72) Inventors: Dai Saitoh, Shimotsuke (JP); Masanobu Asakawa, Utsunomiya (JP); Yasuo Miyoshi, Okayama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/362,489

(22) PCT Filed: Nov. 15, 2012

(86) PCT No.: PCT/JP2012/079594
§ 371 (c)(1),
(2) Date: Jun. 3, 2014

(87) PCT Pub. No.: WO2013/084681
PCT Pub. Date: Jun. 13, 2013

(65) Prior Publication Data
US 2014/0336860 A1    Nov. 13, 2014

(30) Foreign Application Priority Data

Dec. 9, 2011    (JP) .................................. 2011-269581

(51) Int. Cl.
*B60L 11/00*    (2006.01)
*G05D 1/12*    (2006.01)
(Continued)

(52) U.S. Cl.
CPC ............... *B60L 15/2018* (2013.01); *B60L 7/14* (2013.01); *B60L 7/18* (2013.01); *B60L 15/20* (2013.01);
(Continued)

(58) Field of Classification Search
CPC ....... B60L 15/2018; B60L 7/14; B60L 15/20; B60W 10/11; B60W 30/18127; B60W 2540/103; B60W 2550/142; B60W 2720/106; Y02T 10/7275
See application file for complete search history.

(56) References Cited

U.S. PATENT DOCUMENTS 5,915,801 A * 6/1999 Taga et al. ..................... 303/152
2008/0255716 A1* 10/2008 Bandai et al. ................... 701/22
(Continued)

FOREIGN PATENT DOCUMENTS

JP    04-327059 A    11/1992
JP    9-37407 A    2/1997
(Continued)

OTHER PUBLICATIONS

International Search Report dated Feb. 19, 2013 corresponding to International Patent Application No. PCT/JP2012/079594 and English translation thereof.

*Primary Examiner* — Mary Cheung
(74) *Attorney, Agent, or Firm* — Squire Patton Boggs (US) LLP

(57) ABSTRACT

Provided is a method of controlling an electric vehicle capable of preferably performing a regenerative control when a plurality of forward driving ranges are shifted to each other. During travelling on a downhill road, the vehicle executes a downhill regenerative control for adjusting the regenerative amount of an electric motor so that acceleration obtained when an accelerator is closed becomes a downhill acceleration according to a road surface slope. The vehicle also executes an acceleration increase control in which the downhill acceleration obtained when the forward driving ranges are shifted from a second forward driving range to a first forward driving range during travelling on the downhill road is at least temporarily set to an acceleration exceeding the downhill acceleration obtained on the assumption that the vehicle continuously travels on the same road surface slope as that of the currently travelling downhill road in the first forward driving range.

4 Claims, 11 Drawing Sheets

(51) Int. Cl.
*B60L 15/20* (2006.01)
*B60L 7/14* (2006.01)
*B60W 10/11* (2012.01)
*B60W 30/18* (2012.01)
*B60L 7/18* (2006.01)

(52) U.S. Cl.
CPC ......... *B60W 10/11* (2013.01); *B60W 30/18127* (2013.01); *B60W 2540/103* (2013.01); *B60W 2550/142* (2013.01); *B60W 2720/106* (2013.01); *Y02T 10/7275* (2013.01)

(56) References Cited

U.S. PATENT DOCUMENTS

2008/0319601 A1* 12/2008 Komeda et al. ................. 701/29
2009/0112386 A1 4/2009 Saitoh et al.
2014/0297087 A1* 10/2014 Amano ........................... 701/22

FOREIGN PATENT DOCUMENTS

| JP | 2009-106130 A | 5/2009 |
| JP | 2010-230122 A | 10/2010 |
| WO | WO 2010/110098 A1 | 9/2010 |

* cited by examiner

METHOD OF CONTROLLING ELECTRIC VEHICLE

TECHNICAL FIELD

The present invention relates to a method of controlling an electric vehicle having a shift range switching device, e.g., a shift lever, for switching between a first forward driving range and a second forward driving range as shift ranges in response to an input operation performed by the driver of the electric vehicle, and more particularly to a method of controlling an electric vehicle capable of suitably performing a regenerative control process in the first forward driving range and the second forward driving range.

BACKGROUND ART

U.S. Patent Application Publication No. 2009/0112386 (hereinafter referred to as "US 2009/0112386 A1") discloses a regenerative control process for an electric motor on an electric vehicle while the electric vehicle is driving on a downhill road. More specifically, US 2009/0112386 A1 has the task of operating the electric motor in a regenerative mode while the electric vehicle is driving on a downhill road, in order to cause the vehicle to generate an acceleration suitable for the gradient of the road surface while at the same time minimizing the influences of disturbance factors (see Abstract and paragraph [0007]). In order to carry out the task, according to US 2009/0112386 A1, the electric vehicle has a device 25 for determining, depending on the gradient of the road surface, a target acceleration of the vehicle 1 if the operational states of an accelerator pedal and a brake pedal of the vehicle 1 are an OFF state when the vehicle 1 is driving on a downhill road, a device 26 for determining a correction quantity $\Delta Trd$ of a regenerative torque for bringing the actual acceleration of the vehicle 1 close to the target acceleration, a device 21 for determining a basic target torque Trs of an electric motor 2, which becomes a regenerative torque at the time the operational state of the accelerator pedal is the OFF state, depending on the operational state of the accelerator pedal, and a device 27 for determining a target torque Trc by correcting the basic target torque Trs with at least the correction quantity $\Delta Trd$, wherein the output torque of the electric motor 2 is controlled depending on the target torque Trc (see Abstract).

Electric vehicles include an electric vehicle that is capable of driving forward in a plurality of modes, or stated otherwise, an electric vehicle having a plurality of forward driving ranges {International Publication No. 2010/110098 (hereinafter referred to as "WO 2010/110098 A1")}. WO 2010/110098 A1 shows a D position and a B position as corresponding to forward driving positions among the shift positions of a shift lever 32 (see FIG. 2). The D position corresponds to a D range which is a forward driving range for transmitting the drive force for moving the vehicle forward to the drive wheels, whereas the B position corresponds to a decelerated forward driving range (engine braking range) for generating an engine braking effect to decelerate the drive wheels by causing the electric motor to generate a regenerative torque, for example, in the D range (see paragraphs [0049] and [0050]).

SUMMARY OF INVENTION

According to US 2009/0112386 A1, as described above, it is possible to perform a regenerative control process suitable for a downhill road. However, the regenerative control process does not take into account a plurality of forward driving ranges.

The present invention has been made in view of the above problems. It is an object of the present invention to provide a method of controlling an electric vehicle which is capable of suitably performing a regenerative control process at the time a plurality of forward driving ranges are switched from one to another.

According to the present invention, there is provided a method of controlling an electric vehicle having a range switching device for switching between a first forward driving range and a second forward driving range as shift ranges in response to an input operation performed by the driver of the electric vehicle, the method including, when the driver closes an accelerator of the electric vehicle on a flat road, carrying out an accelerator regenerative control process for applying, to the electric vehicle, a braking force equivalent to engine braking by regenerative electric generation by an electric motor, wherein the deceleration of the electric vehicle in the accelerator regenerative control process at the time the second forward driving range is selected, is greater than the deceleration of the electric vehicle in the accelerator regenerative control process at the time the first forward driving range is selected, when the electric vehicle is driving on a downhill road, carrying out a downhill regenerative control process for adjusting the amount of electric power regenerated by the electric motor such that the acceleration of the electric vehicle at the time the accelerator is closed, is equal to a downhill acceleration depending on a road surface gradient, wherein the downhill acceleration at the time the second forward driving range is selected, is smaller than the downhill acceleration at the time the first forward driving range is selected, throughout a region of the road surface gradient that is established as a control range, and carrying out an acceleration increasing control process for setting the downhill acceleration at the time of switching from the second forward driving range to the first forward driving range while the electric vehicle is driving on the downhill road, at least temporarily to an acceleration in excess of the downhill acceleration obtained on the assumption that the electric vehicle is driving continuously in the first forward driving range at the same road surface gradient as the road surface gradient of the downhill road on which the electric vehicle is currently driving.

According to the present invention, at the time the range is switched from the second forward driving range to the first forward driving range while the electric vehicle is driving on the downhill road, the downhill acceleration is set at least temporarily to a downhill acceleration in excess of the normal downhill acceleration for the first forward driving range, i.e., the downhill acceleration obtained on the assumption that the electric vehicle is driving continuously in the first forward driving range at the same road surface gradient as the road surface gradient of the downhill road on which the electric vehicle is currently driving. Therefore, at the time of switching from the second forward driving range to the first forward driving range, the downhill acceleration of the electric vehicle becomes greater than normal even if the downhill regenerative control process is performed in the first forward driving range. Consequently, it is possible to achieve compatibility between an acceleration feel which the driver expects to have by switching from the second forward driving range to the first forward driving range and the downhill regenerative control process that adjusts the downhill acceleration depending on the road surface gradient.

The above method may further include carrying out, after the acceleration increasing control process, an acceleration restoring control process for restoring the downhill acceleration to the downhill acceleration obtained on the assumption that the electric vehicle is driving continuously in the first forward driving range at the same road surface gradient as the road surface gradient of the downhill road on which the electric vehicle is currently driving.

The absolute value of a rate of change of the downhill acceleration according to the acceleration increasing control process may be greater than the absolute value of a rate of change of the downhill acceleration according to the acceleration restoring control process.

According to the present invention, there is also provided a method of controlling an electric vehicle having a range switching device for switching between a first forward driving range and a second forward driving range as shift ranges in response to an input operation performed by the driver of the electric vehicle, the method including, when the driver closes an accelerator of the electric vehicle on a flat road, carrying out an accelerator regenerative control process for applying, to the electric vehicle, a braking force equivalent to engine braking by regenerative electric generation by an electric motor, wherein the deceleration of the electric vehicle in the accelerator regenerative control process at the time the second forward driving range is selected, is greater than the deceleration of the electric vehicle in the accelerator regenerative control process at the time the first forward driving range is selected, when the electric vehicle is driving on a downhill road, carrying out, in at least the first forward driving range, a downhill regenerative control process for adjusting the amount of electric power regenerated by the electric motor such that the acceleration of the electric vehicle at the time the accelerator is closed, is equal to a downhill acceleration depending on a road surface gradient, and carrying out an acceleration increasing control process for setting the downhill acceleration at the time of switching from the second forward driving range to the first forward driving range while the electric vehicle is driving on the downhill road, at least temporarily to an acceleration in excess of the downhill acceleration obtained on the assumption that the electric vehicle is driving continuously in the first forward driving range at the same road surface gradient as the road surface gradient of the downhill road on which the electric vehicle is currently driving.

DESCRIPTION OF EMBODIMENTS

A. Embodiments

1. Description of Overall Arrangement

[1-1. Overall Arrangement]

Figure 1:
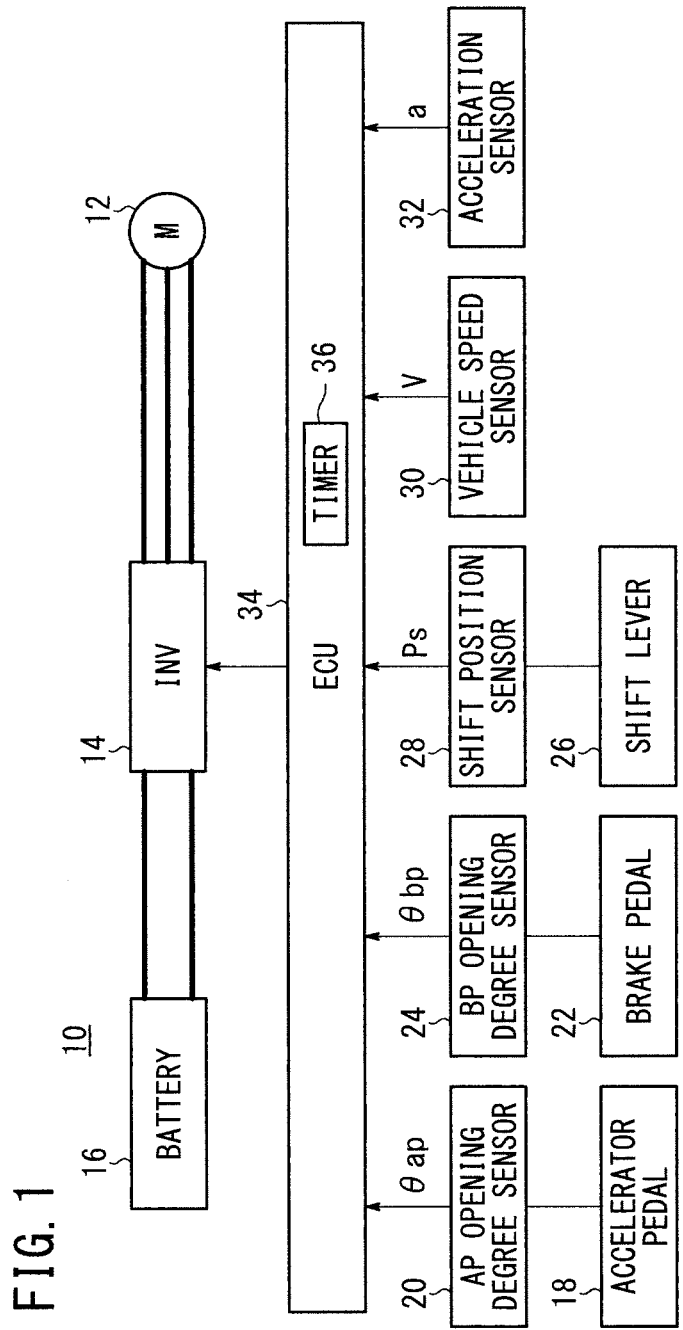
FIG. 1 is a block diagram of an overall arrangement of an electric vehicle according to an embodiment of the present invention.

FIG. 1 shows in block form an overall arrangement of an electric vehicle 10 according to an embodiment of the present invention. The electric vehicle 10 (hereinafter also referred to as "vehicle 10") includes a traction motor (hereinafter referred to as "motor 12"), an inverter 14, a battery 16, an accelerator pedal 18, an accelerator pedal opening degree sensor 20 (hereinafter referred to as "AP opening degree sensor 20"), a brake pedal 22, a brake pedal opening degree sensor 24 (hereinafter referred to as "BP opening degree sensor 24"), a shift lever 26 (range switching device), a shift position sensor 28, a vehicle speed sensor 30, an acceleration sensor 32, and an electronic control unit 34 (hereinafter referred to as "ECU 34").

[1-2. Electric Power System]

The motor 12 (electric motor) comprises a three-phase AC brushless motor which generates a drive force (hereinafter referred to as "motor drive force F" or "drive force F") [N] (or torque [N·m]) for the vehicle 10 based on electric power supplied from the battery 16 through the inverter 14. The motor 12 also operates in a regenerative mode to regenerate electric power (hereinafter referred to as "regenerated electric power Preg") [W] and supplies the regenerated electric power Preg to the battery 16 to charge the battery 16. The motor 12 may supply the regenerated electric power Preg to auxiliaries, not shown.

The inverter 14, which is of the three-phase bridge configuration, performs DC/AC conversion, converts direct current into three-phase alternating current and supplies the three-phase alternating current to the motor 12. Further, when the motor 12 operates in the regenerative mode, the inverter 14 converts alternating current into direct current and supplies the direct current to the battery 16.

The battery 16 comprises an electric energy storage device (energy storage device) including a plurality of battery cells, and may be a lithium ion secondary battery, a nickel hydrogen secondary battery, a capacitor, or the like. According to the present embodiment, a lithium ion secondary battery is used as the battery 16. A DC/DC converter, not shown, may be connected between the inverter 14 and the battery 16 for stepping up or down the output voltage from the battery 16 or the output voltage from the motor 12.

[1-3. Various Sensors]

The AP opening degree sensor 20 detects a depressed amount (hereinafter referred to as "AP opening degree θap") [degrees] of the accelerator pedal 18 from its original position, and supplies the detected AP opening degree θap to the ECU 34. The BP opening degree sensor 24 detects a depressed amount (hereinafter referred to as "BP opening degree θbp") [degrees] of the brake pedal 22 from its original position, and supplies the detected BP opening degree θbp to the ECU 34.

The shift position sensor 28 detects a position (hereinafter referred to as "shift position Ps") of the shift lever 26, and supplies the detected shift position Ps to the ECU 34. According to the present embodiment, the shift positions Ps include "P" corresponding to a parking range as a shift range, "N" corresponding to a neutral range as a shift range, "R" corresponding to a reverse driving range as a shift range, "D" corresponding to a D range (first forward driving range) as a shift range, and "B" corresponding to a B range (second forward driving range) as a shift range.

Each of the D range and the B range is a forward driving range as a shift range. The D range is used when the vehicle 10 is driven normally, i.e., when the vehicle 10 is driving not in the B range. The B range is a shift range in which the amount of electric power regenerated by the motor 12 is made greater than in the D range when the driver of the vehicle 10 wants to increase the amount of electric power regenerated by the vehicle 10, i.e., the motor 12 (e.g., when the vehicle 10 is driving on a downhill road).

The vehicle speed sensor 30 detects an actual vehicle speed V [km/h] of the vehicle 10 and supplies the detected actual vehicle speed V to the ECU 34. The acceleration sensor 32 detects an actual acceleration a [m/s/s] of the vehicle 10 and supplies the detected actual acceleration a to the ECU 34. According to the present embodiment, the acceleration a is used to estimate the gradient (hereinafter referred to as "road surface gradient G" or "gradient G") of the road on which the vehicle 10 is driving, as described in detail later.

[1-4. ECU 34]

The ECU 34 controls the inverter 14 based on output signals from the various sensors to control the output power of the motor 12 (electric motor output power). The ECU 34 has an input/output unit, a processor, and a memory, all not shown.

2. Control Processes According to the Present Embodiment

Various control processes according to the present embodiment will be described below.

[2-1. Motor Drive Force Control Process]

Figure 2:
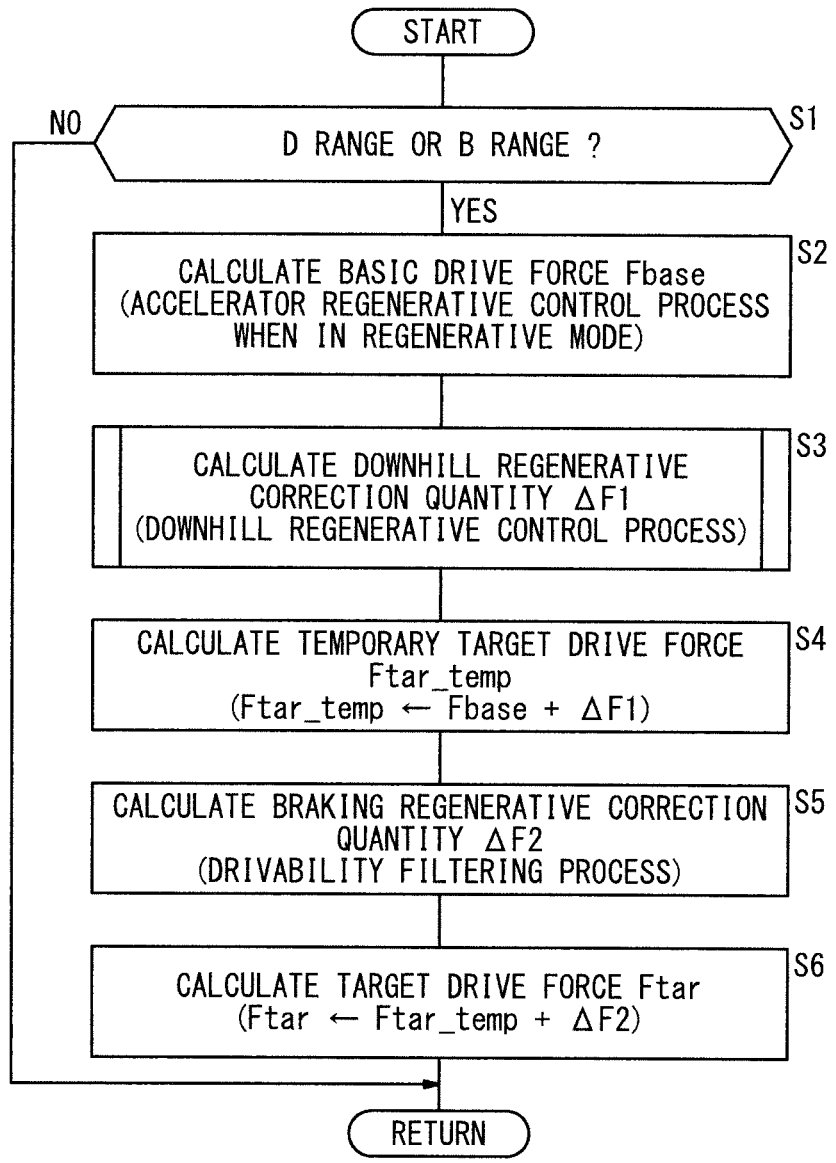
FIG. 2 is a flowchart of a process of controlling the drive force of a traction motor in a D range or a B range according to the embodiment.

FIG. 2 is a flowchart of a process of controlling the drive force F of the motor 12 in the D range or the B range according to the embodiment. The process shown in FIG. 2 is applicable where the vehicle 10 is in either a power mode or a regenerative mode. According to the present embodiment, a target value (hereinafter referred to as "target drive force Ftar") [N] for the drive force F of the motor 12 may be calculated basically by a process similar to the process disclosed in US 2009/0112386 A1. Specifically, whereas US 2009/0112386 A1 uses the torque of the electric motor 2 as a controlled quantity, the present embodiment handles the motor drive force F as controlled quantity in place of the torque. The torque can be calculated by multiplying the drive force F by the radius of a road wheel, not shown.

In step S1 shown in FIG. 2, the ECU 34 judges whether or not the shift range corresponding to the shift position Ps detected by the shift position sensor 28 is the D range or the B range. If the shift range is not the D range or the B range, i.e., if the shift range is the P range, the N range, or the R range (S1: NO), then the process shown in FIG. 2 is ended, and a target driver force Ftar is separately established for the motor 12. If the shift range is the D range or the B range (S1: YES), then control goes to step S2.

In step S2, the ECU 34 calculates a basic drive force Fbase. The ECU 34 calculates the basic drive force Fbase based on the AP opening degree θap detected by the AP opening degree sensor 20, the shift position Ps (or shift range) detected by the shift position sensor 28, and the vehicle speed V detected by the vehicle speed sensor 30. Specifically, the ECU 34 calculates the basic drive force Fbase using a map of basic drive forces Fbase in combination with AP opening degrees θap and vehicle speeds V depending on shift positions Ps (shift ranges). For illustrative purposes, it is assumed that a basic drive force Fbase for driving the vehicle 10 in the power mode is of a positive value, whereas a basic drive force Fbase for operating the vehicle 10 in the regenerative mode is of a negative value.

The AP opening degree θap and the vehicle speed V are used in the same manner as with US 2009/0112386 A1, and the basic drive force Fbase corresponds to the basic target torque Trs disclosed in US 2009/0112386 A1. Consequently, a basic drive force Fbase can be calculated in the same manner as the basic target torque Trs disclosed in US 2009/0112386 A1 (see paragraphs [0071] and [0082] of US 2009/0112386 A1).

However, according to the present embodiment, the vehicle 10 has the D range and the B range each as a shift range for driving the vehicle 10 forward, unlike US 2009/0112386 A1. According to the present embodiment, a map of basic drive forces Fbase in combination with AP opening degrees θap and vehicle speeds V is established in advance for each of the D range and the B range, and a basic drive force Fbase is calculated using the map. As described above, the amount of electric power regenerated by the motor 12 is greater in the B range than in the D range. Consequently, a basic drive force Fbase in the regenerative mode is smaller in the B range (its absolute value is greater because a basic drive force Fbase for operating the vehicle 10 in the regenerative mode is of a negative value).

According to the present embodiment, a process for controlling a basic drive force Fbase for operating the vehicle 10 in the regenerative mode will be referred to as "accelerator regenerative control process" as distinguished from "downhill regenerative control process" to be described below.

In step S3, the ECU 34 performs a downhill regenerative control process and calculates a downhill regenerative correction quantity ΔF1. The downhill regenerative correction quantity ΔF1 is used to accelerate the vehicle 10 gradually while the vehicle 10 is driving on a downhill road, and is similar to the downhill road regenerative correction quantity ΔTrd disclosed in US 2009/0112386 A1 (see paragraph [0074] of US 2009/0112386 A1). According to the present embodiment, however, the downhill regenerative correction quantity ΔF1 is suitable for the vehicle 10 which has a plurality of forward driving ranges (the D range and the B range). Details of the calculation of the downhill regenerative correction quantity ΔF1 (downhill regenerative control process) will be described later with reference to FIGS. 3, 9, 10, etc.

In step S4 in FIG. 2, the ECU 34 calculates a temporary target drive force Ftar_temp. Specifically, the ECU 34 calculates the sum of the basic drive force Fbase calculated in step S2 and the downhill regenerative correction quantity ΔF1 calculated in step S3 as a temporary target drive force Ftar_temp.

In step S5, the ECU 34 calculates a braking regenerative correction quantity ΔF2. The braking regenerative correction quantity ΔF2 is a correction quantity for the motor drive force F which is set in response to the brake pedal 22 being depressed, and is used to enhance the drivability of the vehicle 10. The braking regenerative correction quantity ΔF2 is similar to the braking regenerative correction quantity ΔTrb disclosed in US 2009/0112386 A1 in that it is established based on the BP opening degree θbp. Therefore, the braking regenerative correction quantity ΔF2 can be calculated in the same manner as the braking regenerative correction quantity ΔTrb disclosed in US 2009/0112386 A1, for example (see paragraphs [0073] and [0084] of US 2009/0112386 A1). A process of correcting the temporary target drive force Ftar_temp using the braking regenerative correction quantity ΔF2 is referred to as a drivability filtering process.

In step S6, the ECU 34 calculates a target drive force Ftar. Specifically, the ECU 34 calculates the sum of the temporary target drive force Ftar_temp calculated in step S4 and the braking regenerative correction quantity AF2 calculated in step S5 as a target drive force Ftar.

[2-2. Calculation of Downhill Regenerative Correction Quantity ΔF1 (Downhill Regenerative Control Process)]

(2-2-1. Concept of Downhill Regenerative Control Process)

Figure 3:
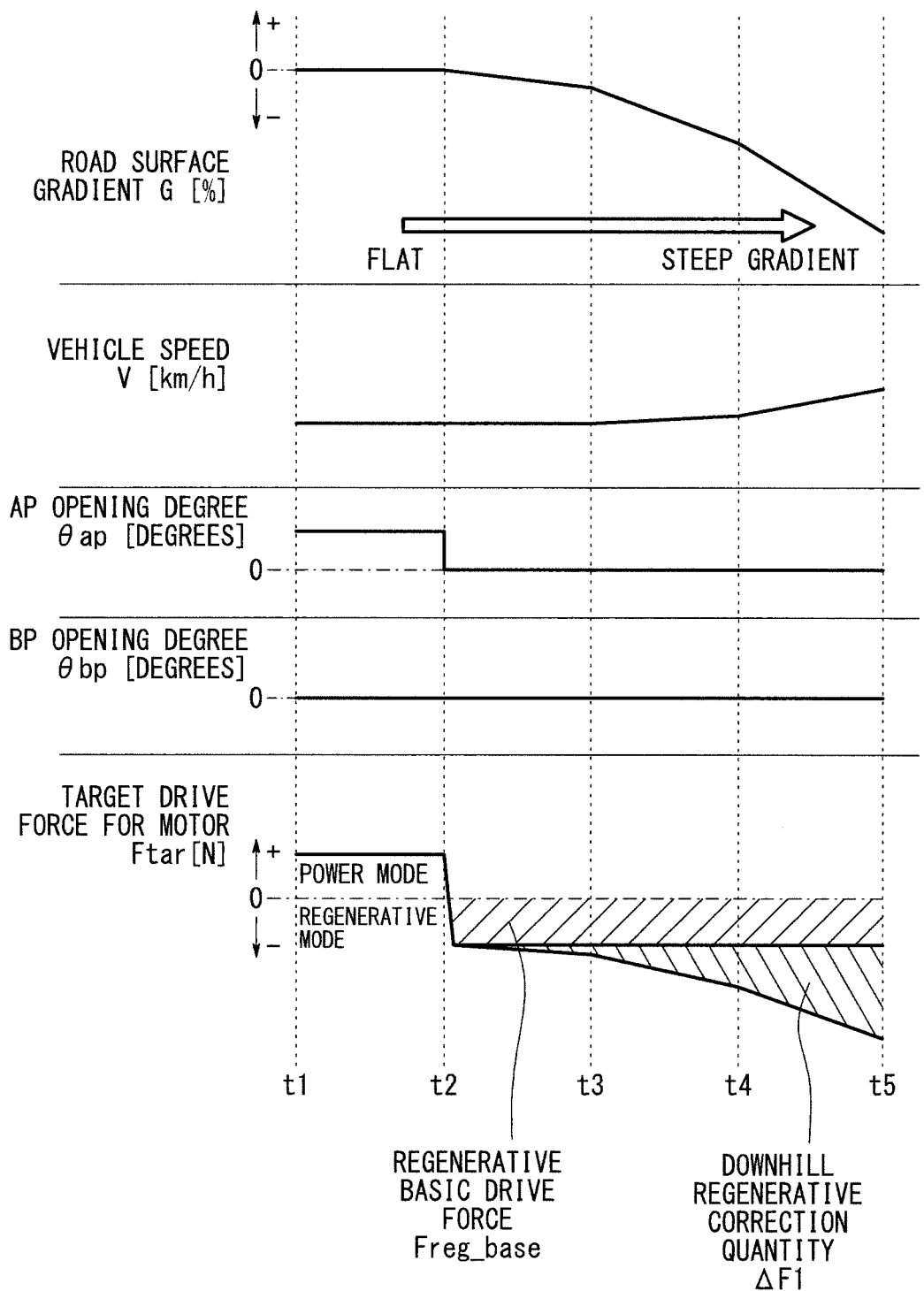
FIG. 3 is a timing chart showing by way of example the relationship between the road surface gradient, the vehicle speed, the accelerator pedal opening degree, the brake pedal opening degree, and the target drive force for the traction motor in various control processes according to the embodiment.

The concept of the downhill regenerative control process according to the present embodiment will be described below. FIG. 3 is a timing chart showing by way of example the relationship between the road surface gradient G, the vehicle speed V, the AP opening degree θap, the BP opening degree θbp, and the target drive force Ftar for the motor 12 in the various control processes according to the present embodiment. For illustrative purposes, the road surface gradient G shown in FIG. 3 is 0% when the road is flat, is of a positive value when the road is uphill, and is of a negative value when the road is downhill (The same will apply hereinafter).

As shown in FIG. 3, the gradient of the road on which the vehicle 10 is driving, i.e., the road surface gradient G, is 0% (i.e., flat road) from time t1 to time t2, and becomes lower from time t2 toward time t5, i.e., the gradient G of the downhill road becomes sharper from time t2 toward time t5. At time t2, the driver returns the accelerator pedal 18 to its original position, causing the AP opening degree θap to return to zero. When the various control processes according to the present embodiment are used at this time, the vehicle speed V increases more gradually than the road surface gradient G decreases, i.e., the absolute value of the road surface gradient G increases.

Specifically, according to the present embodiment, when the AP opening degree θap goes to zero at time t2, the basic drive force Fbase reaches a predetermined value (hereinafter referred to as "regenerative basic drive force Freg_base") (accelerator regenerative control process). The regenerative basic drive force Freg_base is of a fixed value which is set when the AP opening degree θap is zero, and represents a drive force F corresponding to engine braking which is generated by a regenerative electric generation process performed by the motor 12. After the vehicle 10 has entered the downhill road at time t2, the driver does not depress the brake pedal 22, keeping the BP opening degree θbp at zero. Therefore, if only the regenerative basic drive force Freg_base, which is of a fixed value for the regenerative mode, is applied, then the vehicle speed V tends to increase sharply.

According to the present embodiment, the downhill regenerative correction quantity ΔF1 established according to the downhill regenerative control process is used. Specifically, according to the present embodiment, the downhill regenerative correction quantity ΔF1 is established depending on the road surface gradient G in addition to the regenerative basic drive force Freg_base. For example, since the road surface gradient G is continuously decreasing, i.e., the absolute value of the road surface gradient G is continuously increasing, after time t2, the downhill regenerative correction quantity ΔF1 is increased. Consequently, while the vehicle 10 is driving on the downhill road, the vehicle 10 can be accelerated gradually without the driver depressing the brake pedal 22.

(2-2-2. Characteristics for Achieving the Downhill Regenerative Control Process)

Figure 4:
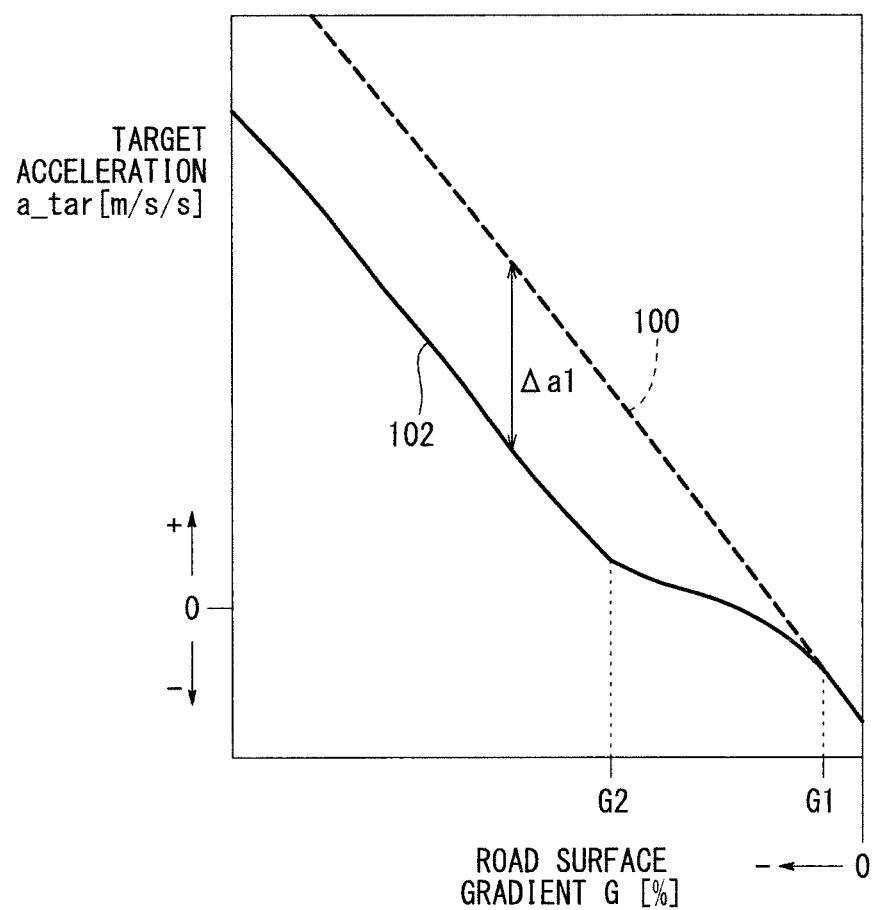
FIG. 4 is a characteristic diagram showing by way of example the relationship between the road surface gradient and the target acceleration used in a downhill regenerative control process while the D range is being selected.

FIG. 4 is a characteristic diagram showing by way of example the relationship between the road surface gradient G and the target acceleration a_tar used in a downhill regenerative control process while the D range is being selected. The characteristics shown in FIG. 4 are plotted when the vehicle speed V is of a certain value, and may be changed depending on the vehicle speed V. Stated otherwise, characteristic diagrams (maps) as shown in FIG. 4 are plotted for respective different values of the vehicle speed V, and one of them is selected and used depending on the vehicle speed V. According to the present embodiment, not only the characteristics for the D range shown in FIG. 4, but also the characteristics for both the D range and the B range (see FIG. 5), are used.

In FIG. 4, a characteristic curve 100 indicated by the broken line is applied when only the regenerative basic drive force Freg_base (accelerator regenerative control process) is used, and a characteristic curve 102 indicated by the solid line is applied when both the regenerative basic drive force Freg_base (accelerator regenerative control process) and the downhill regenerative correction quantity ΔF1 (downhill regenerative control process) are used. According to the present embodiment, as described above, since both the regenerative basic drive force Freg_base (accelerator regenerative control process) and the downhill regenerative correction quantity ΔF1 (downhill regenerative control process) are used, the characteristic curve 102 indicated by the solid line is used in the present embodiment. It should be noted that the characteristic curve 100 indicated by the broken line is illustrated for reference only, and is not used in the present embodiment.

As shown in FIG. 4, the characteristic curve 102 used in the present embodiment is the same as the characteristic curve 100 when the road surface gradient G changes from zero to a given value G1. Stated otherwise, the downhill regenerative control process is inhibited when the road surface gradient G changes from zero to a given value G1. Between the value G1 and a value G2, as the road surface gradient G decreases, i.e., the absolute value of the road surface gradient G increases, the characteristic curve 102 deviates from the characteristic curve 100. That is, the target acceleration a_tar represented by the characteristic curve 102 is lower than the target acceleration a_tar represented by the characteristic curve 100, thereby making it possible for the vehicle 10 to accelerate gradually on the downhill road. When the road surface gradient G becomes smaller than the value G2, i.e., when the absolute value of the road surface gradient G becomes greater than that of the value G2, the difference (hereinafter referred to as "difference Δa1") between the target acceleration a_tar represented by the characteristic curve 102 and the target acceleration a_tar represented by the characteristic curve 100 becomes constant.

According to the downhill regenerative control process, as described above, inasmuch as the downhill regenerative correction quantity ΔF1 is used in addition to the regenerative basic drive force Freg_base, the vehicle is able to accelerate gradually on the downhill road, whereby the manipulation performance by the driver is enhanced.

(2-2-3. Road Surface Gradient G Versus Target Acceleration a_tar Characteristics for D Range and B Range)

According to the present embodiment, as described above, the vehicle 10 has the B range in addition to the D range as shift ranges for driving the vehicle 10 forward. According to the present embodiment, road surface gradient G versus target acceleration a_tar characteristics are established for respective different values of the vehicle speed V for each of the D range and the B range.

Figure 5:
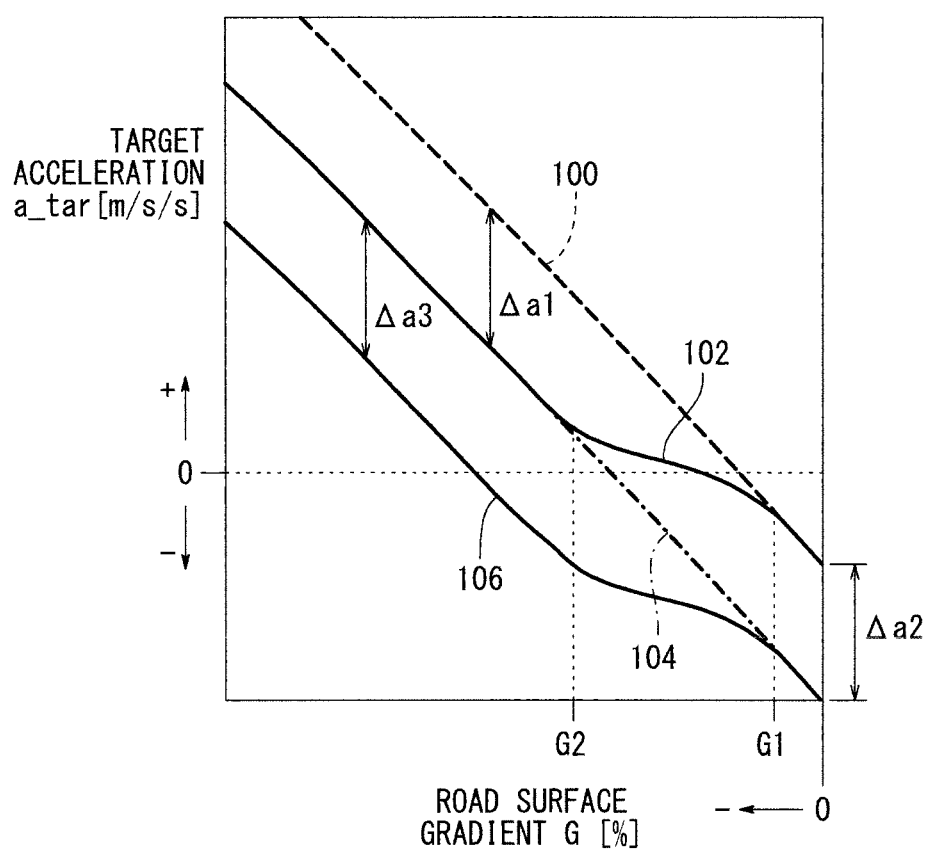
FIG. 5 is a characteristic diagram showing by way of example the relationship between the road surface gradient and the target acceleration for each of the D range and the B range used in the embodiment.

FIG. 5 is a characteristic diagram showing by way of example the relationship between the road surface gradient G and the target acceleration a_tar for each of the D range and the B range used in the present embodiment. The characteristics shown in FIG. 5 are plotted when the vehicle speed V is of a certain value, and may be changed depending on the vehicle speed V. Stated otherwise, characteristic diagrams (maps) as shown in FIG. 5 are plotted for respective different values of the vehicle speed V, and one of them is selected and used depending on the vehicle speed V.

In FIG. 5, a characteristic curve 100 indicated by the broken line and a characteristic curve 102 indicated by the solid line are identical to those shown in FIG. 4. The characteristic curve 102 is used for the D range according to the present embodiment, and the characteristic curve 100 is shown for reference only, not used in the present embodiment.

A characteristic curve 104 indicated by the dot-and-dash line is applied when only the regenerative basic drive force Freg_base (accelerator regenerative control process) is used for the B range, and a characteristic curve 106 indicated by the solid line is applied when both the regenerative basic drive force Freg_base (accelerator regenerative control process) and the downhill regenerative correction quantity ΔF1 (downhill regenerative control process) are used for the B range. According to the present embodiment, as described above, since both the regenerative basic drive force Freg_base and the downhill regenerative correction quantity ΔF1 are used also for the B range, the characteristic curve 106 indicated by the solid line is used in the present embodiment. It should be noted that the characteristic curve 104 indicated by the dot-and-dash line is illustrated for reference only, and is not used in the present embodiment.

A comparison of the characteristic curve 102 for the D range and the characteristic curve 106 for the B range indicates that the target acceleration a_tar for the B range is smaller than the target acceleration a_tar for the D range at the same road surface gradient G. This is because the amount of electric power regenerated by the motor 12 (regenerated electric power Preg) is greater for the B range than for the D range. Therefore, the amount of charge for the battery 16 is greater when the B range is used.

When the road surface gradient G is equal, the target acceleration a_tar represented by the characteristic curve 106 for the B range is set to be always lower than the target acceleration a_tar represented by the characteristic curve 102 for the D range. More specifically, according to the present embodiment, the difference between the target acceleration a_tar represented by the characteristic curve 102 for the D range and the target acceleration a_tar represented by the characteristic curve 106 for the B range is always constant at any value of the road surface gradient G. In other words, the difference (hereinafter referred to as "difference Δa2") between the characteristic curve 102 and the characteristic curve 106 in a region wherein the road surface gradient G changes from zero to the value G1, i.e., a region wherein the downhill regenerative control process is inhibited, and the difference (hereinafter referred to as "difference Δa3") between the characteristic curve 102 and the characteristic curve 106 in a region wherein the road surface gradient G is lower than the value G1, i.e., a region wherein the downhill regenerative control process is permitted, are constant and equal to each other. Consequently, in a case where the range is switched from the D range to the B range when the vehicle 10 is driving on the downhill road, the vehicle 10 is more decelerated than before.

Figure 6:
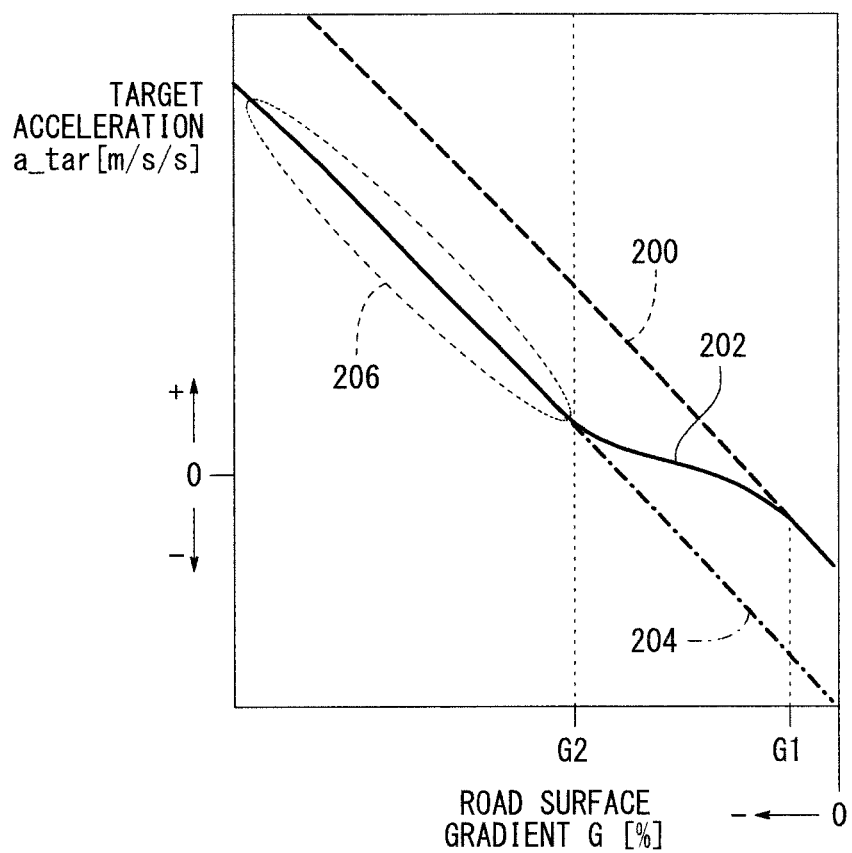
FIG. 6 is a characteristic diagram showing by way of example the relationship between the road surface gradient and the target acceleration for each of the D range and the B range used in a comparative example.

Characteristics shown in FIG. 6 according to a comparative example will be described below in order to illustrate the advantages of the above characteristic curves 102, 106. FIG. 6 is a characteristic diagram showing by way of example the relationship between the road surface gradient G and the target acceleration a_tar for each of the D range and the B range used in a comparative example. The characteristics shown in FIG. 6 are plotted at the same vehicle speed V as the characteristics shown in FIG. 5.

A characteristic curve 200 indicated by the broken line and a characteristic curve 202 indicated by the solid line in FIG. 6 are identical to the characteristic curves 100, 102 shown in FIG. 5. A characteristic curve 204 indicated by the dot-and-dash line in FIG. 6 is identical to the characteristic curve 104 (for reference only) indicated by the dot-and-dash line in FIG. 5. In the comparative example, the characteristic curve 204 is actually used for the B range. Stated otherwise, the characteristic curve 106 for the B range indicated by the solid line in FIG. 5 is not used in the comparative example.

According to the comparative example shown in FIG. 6, as can be seen from the above description, when the vehicle 10 is driving in the D range, both the regenerative basic drive force Freg_base (accelerator regenerative control process) and the downhill regenerative correction quantity ΔF1 (downhill regenerative control process) are used, and when the vehicle 10 is driving in the B range, only the regenerative basic drive force Freg_base (accelerator regenerative control process) is used.

When the road surface gradient G becomes smaller than the value G2, i.e., when the absolute value of the road surface gradient G becomes greater than that of the value G2, the characteristic curve 202 for the D range and the characteristic curve 204 for the B range agree with each other in an elliptical region 206 indicated by the broken line. Therefore, even when the range is switched from the D range to the B range while the vehicle 10 is driving on the downhill road whose road surface gradient G is smaller than the value G2, i.e., on a downhill road steeper than the road having the value G2, the target acceleration a_tar remains unchanged. As a result, the driver tends to feel strange and uncomfortable.

In addition, when the range is switched from the D range to the B range, it is considered that the driver is seeking a greater deceleration. According to the comparative example shown in FIG. 6, however, even when the driver changes from the D range to the B range, since the target acceleration a_tar remains unchanged, the deceleration of the vehicle 10 does not increase. As a result, the driver is possibly forced to depress the brake pedal 22, thereby tending to impair the driving performance of the vehicle 10.

In contrast thereto, according to the present embodiment, the above problems can be solved because the characteristic curves 102, 106 shown in FIG. 5 are used.

(2-2-4. Acceleration Increasing Control Process)
(2-2-4-1. Problems)

As described above, the downhill regenerative control process according to the present embodiment uses the characteristic curves 102, 106 shown in FIG. 5. Therefore, during the downhill regenerative control process, when the range is switched from the D range to the B range, the target acceleration a_tar decreases, and when the range is switched from the B range to the D range, the target acceleration a_tar increases. However, even when the range is switched from the B range to the D range, if the downhill regenerative control process continues, i.e., if the characteristic curve 102 shown in FIG. 5 is used, then the target acceleration a_tar is lower than if only the accelerator regenerative control process is carried out, i.e., if the characteristic curve 100 shown in FIG. 5 is used.

Figure 7:
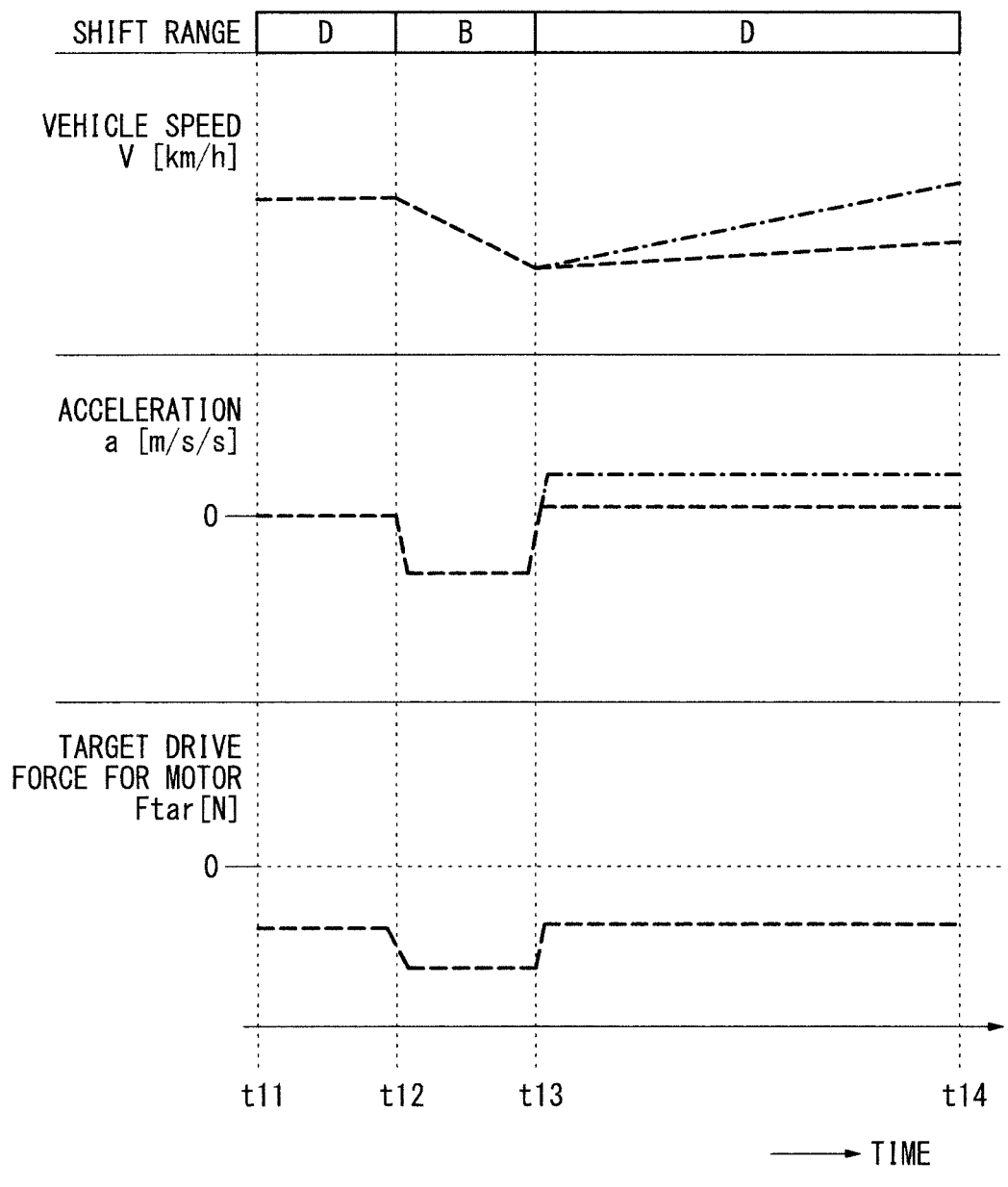
FIG. 7 is a timing chart illustrating problems caused by continuing the downhill regenerative control process at the time the range is switched from the B range to the D range.

FIG. 7 is a timing chart illustrating problems caused by continuing the downhill regenerative control process at the time the range is switched from the B range to the D range. More specifically, FIG. 7 is a timing chart of the vehicle speed V and the acceleration a of each of an electric vehicle (hereinafter referred to as "comparative vehicle") according to a comparative example which performs the accelerator regenerative control process and the downhill regenerative control process and a general gasoline-powered vehicle whose performance is equivalent to the comparative vehicle, and the target drive force Ftar for the motor 12 of the comparative vehicle. It is assumed that the acceleration a of the comparative vehicle is equal to the target acceleration a_tar. FIG. 7 does not show any corresponding data of the general gasoline-powered vehicle in the field "TARGET DRIVE FORCE Ftar FOR MOTOR".

From time t11 to time t14 in FIG. 7, each broken-line curve shows by way of example data of the comparative vehicle which performs the accelerator regenerative control process and the downhill regenerative control process. From time t13 to time t14 in FIG. 7, dot-and-dash-line curves representing the vehicle speed V and the acceleration a show by way of example data of the general gasoline-powered vehicle. It should be noted that from time t11 to time t13, no data of the general gasoline-powered vehicle are shown in FIG. 7.

From time t11 to time t14 in FIG. 7, the road is downhill, and the road surface gradient G between time t12 and time t13 is smaller (i.e., greater in absolute value) and steeper than between time t11 and time t12 and between time t13 and time t14. Therefore, the D range is selected between time t11 and time t12 and between time t13 and time t14, and the B range is selected between time t12 and time t13.

The general gasoline-powered vehicle can achieve a deceleration corresponding to the deceleration according to the accelerator regenerative control process because the gasoline-powered vehicle is capable of performing engine-braking, but does not perform a function or a control process corresponding to the downhill regenerative control process. The comparative vehicle performs both the accelerator regenerative control process and the downhill regenerative control process. Thus, whereas the general gasoline-powered vehicle does not perform a function or a control process corresponding to the downhill regenerative control process, the comparative vehicle performs both the accelerator regenerative control process and the downhill regenerative control process. Consequently, from time t13 to time t14, the comparative vehicle has a smaller acceleration a than the general gasoline-powered vehicle. Thus, even when the driver of the comparative vehicle switches from the B range to the D range, the driver may possibly feel strange and uncomfortable because the acceleration of the electric vehicle does not increase sufficiently and the driver fails to have an acceleration feel as expected.

In view of the above problems, when the range is switched from the B range to the D range, the electric vehicle 10 according to the present embodiment carries out an acceleration increasing control process for increasing the target acceleration a_tar temporarily and thereafter carries out an acceleration restoring control process for restoring the target acceleration a_tar to its normal value (the value represented by the characteristic curve 102 shown in FIG. 5).

(2-2-4-2. Overview of Acceleration Increasing Control Process and Acceleration Restoring Control Process)

Figure 8:
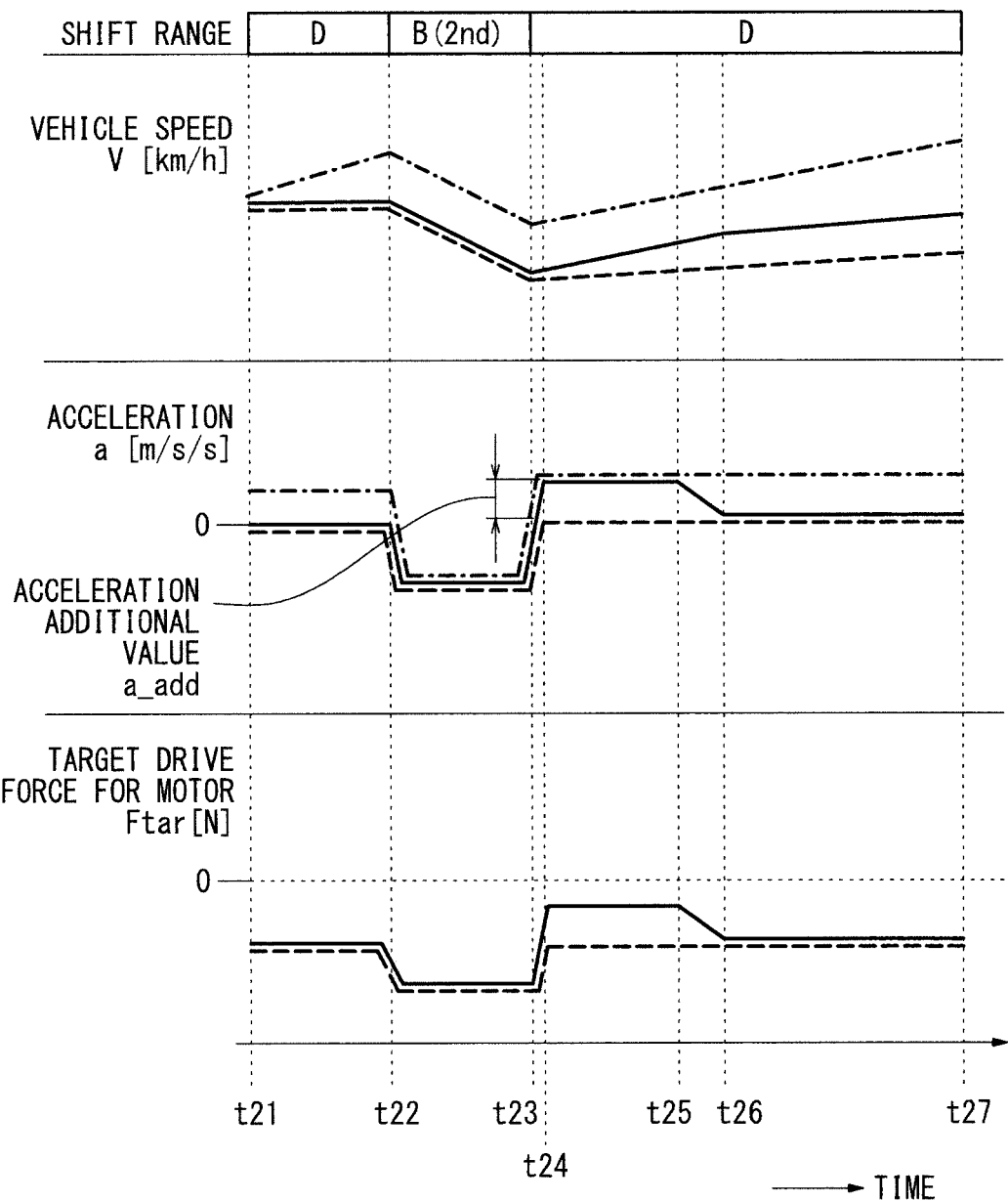
FIG. 8 is a timing chart illustrating an acceleration increasing control process and an acceleration restoring control process according to the embodiment.

FIG. 8 is a timing chart illustrating the acceleration increasing control process and the acceleration restoring control process according to the present embodiment. More specifically, FIG. 8 is a timing chart of the vehicle speed V and the acceleration a of each of the comparative vehicle (the electric vehicle according to the comparative example which performs the accelerator regenerative control process and the downhill regenerative control process), the general gasoline-powered vehicle (whose performance is equivalent to the comparative vehicle), and the electric vehicle 10 according to the present embodiment, and the target drive force Ftar for the motor 12 of each of the comparative vehicle and the electric vehicle 10 according to the present embodiment. It is assumed that the acceleration a of the comparative vehicle and the electric vehicle 10 is equal to the target acceleration a_tar.

In FIG. 8, each broken-line-curve represents by way of example data of the comparative example, each dot-and-dash-line curve represents by way of example data of the general gasoline-powered vehicle, and each solid-line curve represents by way of example data of the electric vehicle 10 according to the present embodiment. FIG. 8 does not show any corresponding data of the general gasoline-powered vehicle in the field "TARGET DRIVE FORCE Ftar FOR MOTOR".

From time t21 to time t27 in FIG. 8, the road is downhill, and the road surface gradient G between time t22 and time t23 is smaller (i.e., greater in absolute value) and steeper than between time t21 and time t22 and between time t23 and time t27. Therefore, the D range is selected between time t21 and time t22 and between time t23 and time t27, and the B range is selected (a second range corresponding to the B range is selected in the general gasoline-powered vehicle) between time t22 and time t23.

In FIG. 8, the vehicle speed V of the general gasoline-powered vehicle is higher than the vehicle speed V of the comparative vehicle and the electric vehicle 10. This is because the general gasoline-powered vehicle is capable of performing engine-braking, but does not perform a function or a control process corresponding to the downhill regenerative control process.

From time t21 to time t23, the vehicle speeds V, the accelerations a, and the target drive forces Ftar for the motor 12 of the comparative vehicle and the electric vehicle 10 are identical to each other. From time t23, at which the range is switched from the B range to the D range, to time t26, the vehicle speed V, the acceleration a, and the target drive force Ftar for the motor 12 of the electric vehicle 10 are greater than those of the comparative vehicle. Stated otherwise, the vehicle speed V, the acceleration a, and the target drive force Ftar for the motor 12 of the electric vehicle 10 increase in the same manner as with the general gasoline-powered vehicle.

This is because the electric vehicle 10 according to the present embodiment performs the acceleration increasing control process.

As described above, when the range is switched from the B range to the D range, the electric vehicle 10 increases the vehicle speed V, the acceleration a, and the target drive force Ftar for the motor 12, whereby the vehicle 10 makes it possible to accelerate in the same manner as with the general gasoline-powered vehicle.

From time t25 to time t26, the temporary increase in the target acceleration a_tar is gradually reduced (acceleration restoring control process). At time t26, the vehicle speeds V, the accelerations a, and the target drive forces Ftar for the motor 12 of the comparative vehicle and the electric vehicle 10 become identical to each other, and thereafter continue to be identical to each other.

(2-2-5. Details of Calculation of the Downhill Regenerative Correction Quantity ΔF1 (Downhill Regenerative Control Process))

Figure 9:
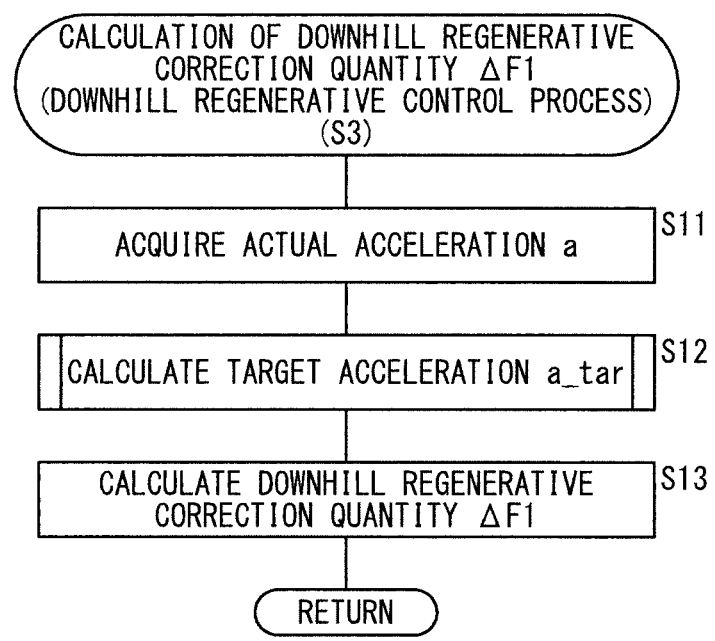
FIG. 9 is a flowchart of a process of calculating a downhill regenerative correction quantity (downhill regenerative control process) (details of S3 in FIG. 2) according to the embodiment.

Details of the calculation of a downhill regenerative correction quantity ΔF1 (FIG. 3) (downhill regenerative control process) in step S3 in FIG. 2 will be described below. FIG. 9 is a flowchart of a process of calculating a downhill regenerative correction quantity ΔF1 (downhill regenerative control process) (details of S3 in FIG. 2) according to the present embodiment.

In step S11, the ECU 34 acquires the actual acceleration a of the vehicle 10 from the acceleration sensor 32. In step S12, the ECU 34 calculates a_target acceleration a_tar (see FIG. 5). Details of the calculation of a target acceleration a_tar will be described later with reference to FIG. 10.

In step S13, the ECU 34 calculates a downhill regenerative correction quantity ΔF1. Specifically, the ECU calculates the difference (hereinafter referred to as "difference D1") between the actual acceleration a and the target acceleration a_tar, and then calculates a downhill regenerative correction quantity ΔF1 according to a feedback control process depending on the difference D1. Stated otherwise, as the absolute value of the difference D1 is greater, the absolute value of the downhill regenerative correction quantity ΔF1 is greater.

Figure 10:
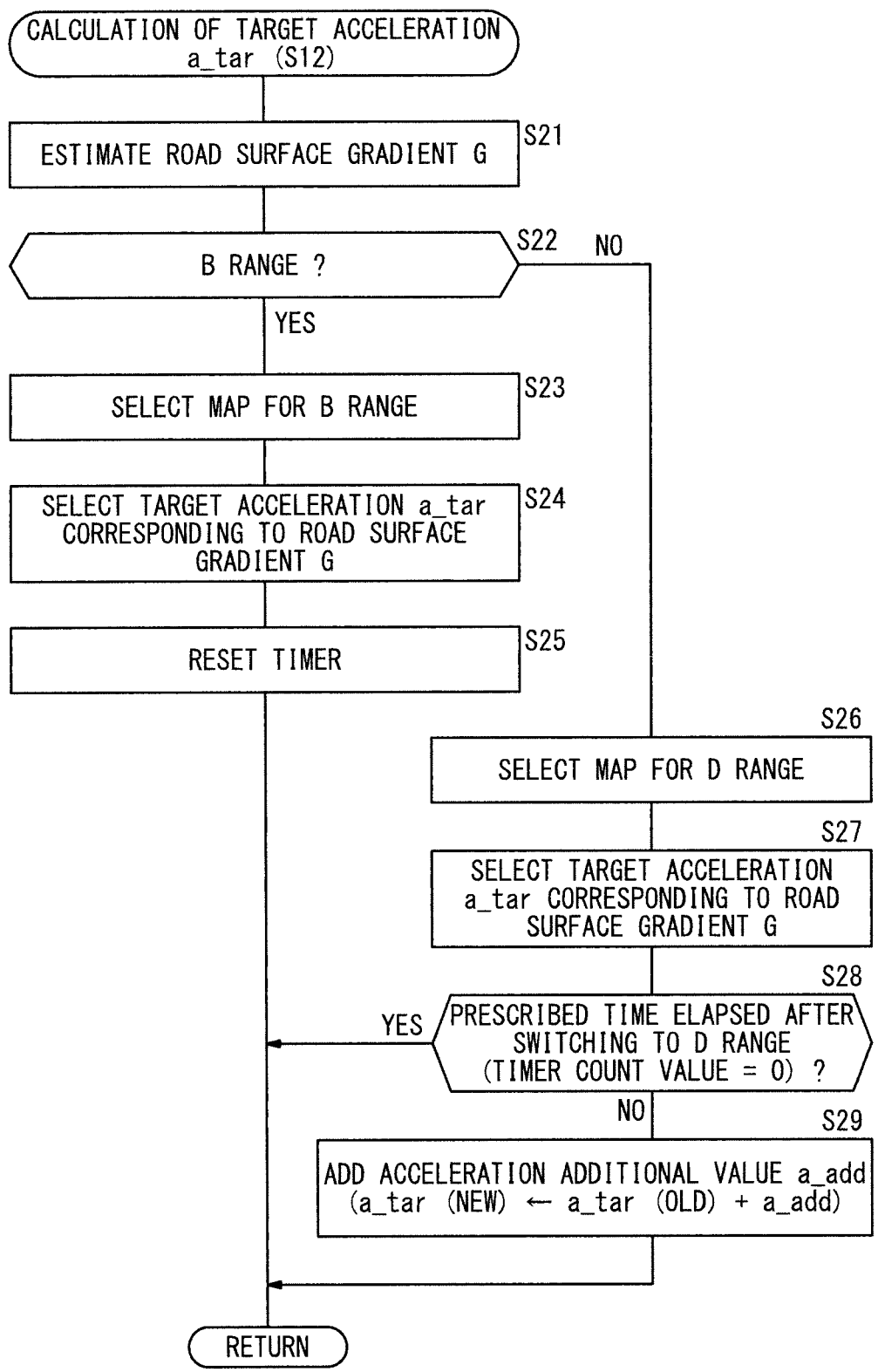
FIG. 10 is a flowchart of a process of calculating a target acceleration (details of S12 in FIG. 9) according to the embodiment.

FIG. 10 is a flowchart of a process of calculating a target acceleration a_tar (details of S12 in FIG. 9) according to the present embodiment. In step S21, the ECU 34 estimates a road surface gradient G. Specifically, the ECU 34 calculates a road surface gradient G using the acceleration a from the acceleration sensor 32, etc. For example, the ECU 34 may estimate a road surface gradient G according to the process disclosed in US 2009/0112386 A1 (see FIG. 5, paragraphs [0076], [0077], [0090] through [0110] of US 2009/0112386 A1). Alternatively, the ECU 34 may estimate a road surface gradient G according to other existing processes.

In step S22, the ECU 34 judges whether the shift range is the B range or not. If the shift range is the B range (S22:YES), then, in step S23, the ECU 34 selects the map for the B range, i.e., the characteristic curve 106 in FIG. 5. As described above, the map, i.e., the characteristic curve 106, is selected depending on the vehicle speed V. Therefore, the ECU 34 also uses the vehicle speed V from the vehicle speed sensor 30 in selecting a map.

In step S24, the ECU 34 selects a target acceleration a_tar corresponding to the road surface gradient G estimated in step S21 according to the map selected in step S23, i.e., the characteristic curve 106 in FIG. 5.

Figure 11:
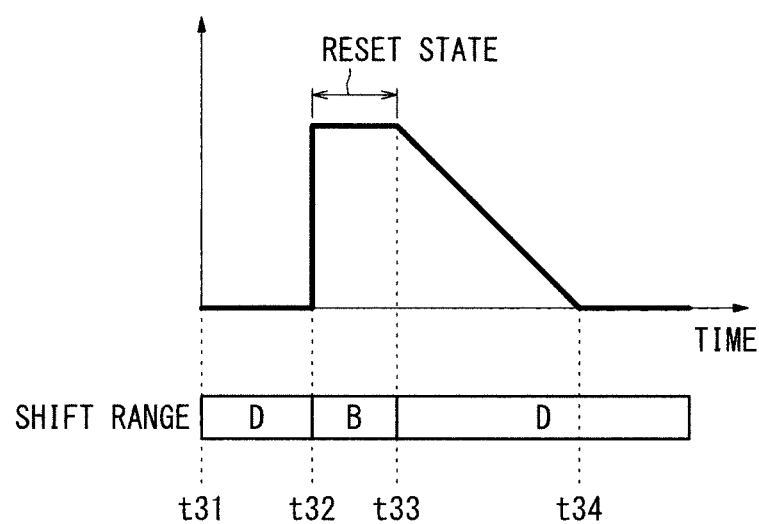
FIG. 11 is a diagram showing by way of example how a timer operates in the acceleration increasing control process and the acceleration restoring control process.

In step S25, the ECU 34 resets a timer 36 (see FIG. 1) of the ECU 34 which is used for the acceleration increasing control process and the acceleration restoring control process. FIG. 11 shows by way of example how the timer 36 operates. As can be seen from FIG. 11, the timer 36, which is a count-down timer, is kept at an initial value when the B range is selected from time t32 to time t33. When the D range is selected, the timer 36 counts down from time t33 to time t34. Therefore, using the timer 36, it is possible to measure a prescribed period that has elapsed after switching from the B range to the D range.

In step S22 of FIG. 10, if the shift range is not the B range (S22: NO), i.e., if the shift range is the D range, then, in step S26, the ECU 34 selects the map for the D range, i.e., the characteristic curve 102 in FIG. 5. As described above, the map, i.e., the characteristic curve 102, is selected depending on the vehicle speed V. Therefore, the ECU 34 also uses the vehicle speed V from the vehicle speed sensor 30 in selecting the map.

In step S27, the ECU 34 selects a target acceleration a_tar corresponding to the road surface gradient G estimated in step S21 according to the map selected in step S26, i.e., the characteristic curve 102 in FIG. 5.

In step S28, the ECU 34 judges whether the count value of the timer 36 has reached zero or not, or stated otherwise, judges whether or not the prescribed period has elapsed after switching from the B range to the D range. If the prescribed period has not elapsed (S28: NO), then, in step S29, the ECU 34 determines the sum (hereinafter referred to as "target acceleration a_tar (new)") of the target acceleration a_tar selected in step S27 (hereinafter referred to as "target acceleration a_tar (old)") and an acceleration additional value a_add, as a final target acceleration a_tar in the present processing cycle. However, immediately after the range has been switched from the B range to the D range, the ECU 34 gradually increases the target acceleration a_tar as with the acceleration a (=target acceleration a_tar) from time t23 to time t24 in FIG. 8. After step S29, the present processing cycle is ended. Then, a next processing cycle is started from step S21.

If the prescribed period has elapsed (S28: YES), then the present processing cycle is ended. Then, a next processing cycle is started from step S21. However, immediately after the prescribed period has elapsed, the ECU 34 gradually decreases the target acceleration a_tar as with the acceleration a (=target acceleration a_tar) from time t25 to time t26 in FIG. 8. The absolute value of the rate (gradient) at which the target acceleration a_tar is decreased at this time is smaller than the absolute value of the rate (gradient) at which the target acceleration a_tar is increased from time t23 to time t24, i.e., the gradient is lower.

3. Advantages of the Present Embodiment

According to the present embodiment, as described above, when the road surface gradient G is equal to or smaller than 0%, at the same road surface gradient G, the target acceleration a_tar, i.e., the characteristic curve 106 in FIG. 5, for the B range is lower than the target acceleration a_tar, i.e., the characteristic curve 102 in FIG. 5, for the D range (see FIG. 5). Stated otherwise, when the road surface gradient G is 0% or less, at the same road surface gradient G, the deceleration for the B range is greater than the deceleration for the D range. Therefore, when the shift range is switched from the D range to the B range, the deceleration of the vehicle 10 is increased irrespectively of whether the vehicle 10 is driving on a flat road or a downhill road. The vehicle 10 thus makes the driver feel decelerated, and prevents the driver from having a feeling of irresponsiveness to the driver's operation. Further, when the shift range is switched from the B range to the D range, the vehicle 10 makes the driver feel accelerated irrespectively of whether the vehicle 10 is driving on a flat road or a downhill road. Thus, the vehicle 10 prevents the driver from feeling strange and uncomfortable due to the unchanged acceleration a. Consequently, it is possible to perform an appropriate regenerative control process for the vehicle 10 which has a plurality of forward driving ranges, i.e., the D range and the B range.

According to the present embodiment, the difference Δa2 between the characteristic curve 102 and the characteristic curve 106 in the region wherein the road surface gradient G changes from 0% to the value G1%, i.e., the region wherein the downhill regenerative control process is inhibited, and the difference Δa3 between the characteristic curve 102 and the characteristic curve 106 in the region wherein the road surface gradient G is lower than the value G1, i.e., the region wherein the downhill regenerative control process is permitted, are constant and equal to each other.

With the above arrangement, the driver is able to recognize a change in the acceleration (deceleration) similarly when the D range and the B range are switched while the vehicle 10 is in the downhill regenerative control process and when the D range and the B range are switched while the vehicle 10 is in the accelerator regenerative control process on a flat road. Therefore, the electric vehicle 10 can prevent the driver from having a feeling of irresponsiveness to the driver's operation or can make the driver feel more accelerated.

According to the present embodiment, when the range is switched from the B range to the D range while the vehicle 10 is driving on a downhill road, the sum of the normal target acceleration a_tar, i.e., the characteristic curve 102 in FIG. 5, for the D range and the acceleration additional value a_add is temporarily used as an actual target acceleration a_tar (see FIG. 8 and S29 in FIG. 10). Therefore, when the range is switched from the B range to the D range, the acceleration a of the electric vehicle 10 becomes greater than normal even if the downhill regenerative control process is performed in the D range. Consequently, it is possible to achieve compatibility between an acceleration feel which the driver expects to have by switching from the B range to the D range and the downhill regenerative control process that adjusts the target acceleration a_tar depending on the road surface gradient G.

According to the present embodiment, after the acceleration increasing control process that adds the acceleration additional value a_add, the acceleration restoring control process that restores the target acceleration a_tar to the normal characteristic curve 102 for the D range. Thus, when the range is switched from the B range to the D range, it is possible to restore the acceleration a to the normal acceleration a (target acceleration a_tar) after having temporarily increased the acceleration a (target acceleration a_tar). Therefore, immediately after switching from the B range to the D range, it is possible to give the driver an acceleration feel as expected and thereafter prevent the electric vehicle 10 from being excessively accelerated using the normal target acceleration a_tar.

According to the present embodiment, the absolute value of the rate (gradient) at which the target acceleration a_tar is increased from time t23 to time t24 in FIG. 8 is greater than the absolute value of the rate (gradient) at which the target acceleration a_tar is decreased from time t25 to time t26. Therefore, when the acceleration increasing control process is performed, the acceleration a can be sharply increased to accelerate the electric vehicle 10 quickly. On the other hand, when the acceleration restoring control process is performed, the target acceleration a_tar is gradually decreased and made equal to the normal target acceleration a_tar, i.e., the characteristic curve 102 in FIG. 5, thereby changing to the normal downhill regenerative control process without making the driver feel strange and uncomfortable.

B. Modifications

The present invention is not limited to the above embodiments, but may employ various arrangements based on the disclosure of the above description. For example, the present invention may employ the following arrangements.

1. Objects to which the Present Invention is Applicable

In the above embodiment, the vehicle 10 which has the single motor 12 and the single battery 16 has been described (see FIG. 1). However, the present invention is not limited to the illustrated vehicle 10, but is applicable to other objects. For example, the present invention is applicable to an electric vehicle having a propulsive motor and a regenerative motor separately. The present invention is also applicable to a hybrid vehicle having an engine in addition to the motor 12. Furthermore, the present invention is also applicable to a fuel cell vehicle having a fuel cell in addition to the motor 12 and the battery 16. Still further, the present invention is applicable not only to the electric vehicle 10 but also to another mobile body or a movable apparatus, e.g., a robot arm, having a plurality of forward driving ranges (driving ranges in one direction). The vehicle 10 is not limited to a four-wheeled vehicle, but may be a truck, a motorcycle, an electric-motor-assisted bicycle, and the like.

2. Shift Ranges

In the above embodiment, the shift ranges include the P range, the N range, the R range, the D range, and the B range. However, the shift ranges are not limited to these ranges, but may include other ranges insofar as they have a plurality of shift ranges for driving in one direction (the D range and the B range in the above embodiment).

In the above embodiment, the driver switches to each of the shift ranges with the shift lever 26. However, the driver may switch to each of the shift ranges, particularly at least one of the D range and the B range, using another switching device. For example, the driver may switch between the D range and the B range, for example, using a button (not shown) on the steering wheel, in addition to or instead of the shift lever 26.

3. Accelerator Regenerative Control Process, Downhill Regenerative Control Process, Acceleration Increasing Control Process, and Acceleration Restoring Control Process In the above embodiment, both the accelerator regenerative control process and the downhill regenerative control process have been described as being carried out for each of the D range and the B range. However, insofar as the accelerator regenerative control process and the downhill regenerative control process are carried out in effect, these control processes do not need to be formally distinguished from each other. For example, the accelerator regenerative control process may be included in the downhill regenerative control process. Stated otherwise, a regenerative control process that is performed while the vehicle is driving on a downhill road may be collectively called a downhill regenerative control process, and the accelerator regenerative control process may be included in the downhill regenerative control process.

In the above embodiment, the downhill regenerative control process is carried out for each of the D range and the B range (the characteristic curves 102, 106 in FIG. 5). However, the present invention is not limited to the downhill regenerative control process thus carried out in terms of the acceleration increasing control process and the acceleration restoring control process. For example, the present invention is also applicable to an arrangement where the downhill regenerative control process is carried out only for the D range and only the accelerator regenerative control process is carried out for the B range. More specifically, the acceleration increasing control process and the acceleration restoring control process may be carried out, for example, in the characteristic curves 202, 204 of the comparative example shown in FIG. 6. Alternatively, the acceleration increasing control process and the acceleration restoring control process may be carried out in a combination of the characteristic curve 202 of the comparative example shown in FIG. 6 and a characteristic curve that is produced by shifting the characteristic curve 204 downwardly in its entirety in FIG. 6.

In the above embodiment, the acceleration additional value a_add is used in the acceleration increasing control process. Stated otherwise, the acceleration increasing control process has been described as being independent from the downhill regenerative control process and the accelerator regenerative control process. However, the acceleration increasing control process may be carried out by at least partly stopping or limiting at least one of the downhill regenerative control process and the accelerator regenerative control process, instead of using the acceleration additional value a_add. For example, it is possible to use the characteristic curve 100 instead of the characteristic curve 102 in FIG. 5 for the acceleration increasing control process performed at the time of switching from the B range to the D range.

In the above embodiment, after the acceleration increasing control process is temporarily carried out, the acceleration restoring control process is carried out. However, the acceleration increasing control process may be continuously carried out without the acceleration restoring control process. For example, after the range has been switched from the B range to the D range, the acceleration increasing control process may be continued as long as the D range goes on.

The invention claimed is:

1. A method of controlling an electric vehicle having a range switching device for switching between a first forward driving range and a second forward driving range as shift ranges in response to an input operation performed by a driver of the electric vehicle, the method comprising:
   when the driver closes an accelerator of the electric vehicle on a flat road, carrying out an accelerator regenerative control process for applying, to the electric vehicle, a braking force equivalent to engine braking by regenerative electric generation by an electric motor;
   wherein a deceleration of the electric vehicle in the accelerator regenerative control process at the time the second forward driving range is selected, is greater than a deceleration of the electric vehicle in the accelerator regenerative control process at the time the first forward driving range is selected;
   when the electric vehicle is driving on a downhill road, carrying out a downhill regenerative control process for adjusting an amount of electric power regenerated by the electric motor such that an acceleration of the electric vehicle at the time the accelerator is closed, is equal to a downhill acceleration depending on a road surface gradient;
   wherein the downhill acceleration at the time the second forward driving range is selected, is smaller than the downhill acceleration at the time the first forward driving range is selected, throughout a region of the road surface gradient that is established as a control range; and
   carrying out an acceleration increasing control process for setting the downhill acceleration at the time of switching from the second forward driving range to the first forward driving range while the electric vehicle is driving on the downhill road, at least temporarily to an acceleration in excess of the downhill acceleration obtained on the assumption that the electric vehicle is driving continuously in the first forward driving range at the same road surface gradient as the road surface gradient of the downhill road on which the electric vehicle is currently driving.

2. The method of controlling the electric vehicle according to claim 1, further comprising:
   carrying out, after the acceleration increasing control process, an acceleration restoring control process for restoring the downhill acceleration to the downhill acceleration obtained on the assumption that the electric vehicle is driving continuously in the first forward driving range at the same road surface gradient as the road surface gradient of the downhill road on which the electric vehicle is currently driving.

3. The method of controlling the electric vehicle according to claim 2, wherein the absolute value of a rate of change of the downhill acceleration according to the acceleration increasing control process is greater than the absolute value of a rate of change of the downhill acceleration according to the acceleration restoring control process.

4. A method of controlling an electric vehicle having a range switching device for switching between a first forward driving range and a second forward driving range as shift ranges in response to an input operation performed by a driver of the electric vehicle, the method comprising:
   when the driver closes an accelerator of the electric vehicle on a flat road, carrying out an accelerator regenerative control process for applying, to the electric vehicle, a braking force equivalent to engine braking by regenerative electric generation by an electric motor;
   wherein a deceleration of the electric vehicle in the accelerator regenerative control process at the time the second forward driving range is selected, is greater than a deceleration of the electric vehicle in the accelerator regenerative control process at the time the first forward driving range is selected;
   when the electric vehicle is driving on a downhill road, carrying out, in at least the first forward driving range, a downhill regenerative control process for adjusting an amount of electric power regenerated by the electric motor such that an acceleration of the electric vehicle at the time the accelerator is closed, is equal to a downhill acceleration depending on a road surface gradient; and
   carrying out an acceleration increasing control process for setting the downhill acceleration at the time of switching from the second forward driving range to the first forward driving range while the electric vehicle is driving on the downhill road, at least temporarily to an acceleration in excess of the downhill acceleration obtained on the assumption that the electric vehicle is driving continuously in the first forward driving range at the same road surface gradient as the road surface gradient of the downhill road on which the electric vehicle is currently driving.

* * * * *